United States Patent
Olszewski et al.

(10) Patent No.: US 12,050,930 B2
(45) Date of Patent: Jul. 30, 2024

(54) PARTITION MIGRATION WITH CRITICAL TASK PRIORITIZATION

(71) Applicant: International Business Machines Corporation, Armonk, NY (US)

(72) Inventors: Bret R. Olszewski, Austin, TX (US); Arnold Flores, Round Rock, TX (US); Peter J. Heyrman, Rochester, MN (US); Tommy Tse, Portland, OR (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 501 days.

(21) Appl. No.: 17/355,782

(22) Filed: Jun. 23, 2021

(65) Prior Publication Data

US 2022/0413902 A1    Dec. 29, 2022

(51) Int. Cl.
*G06F 9/48* (2006.01)
*G06F 9/30* (2018.01)
*G06F 9/455* (2018.01)
*G06F 9/50* (2006.01)

(52) U.S. Cl.
CPC .......... *G06F 9/4856* (2013.01); *G06F 9/3009* (2013.01); *G06F 9/45558* (2013.01); *G06F 9/4881* (2013.01); *G06F 9/5061* (2013.01); *G06F 9/5077* (2013.01); *G06F 9/5088* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| 7,512,826 B2 | 3/2009 | Armstrong et al. |
| 8,200,771 B2 | 6/2012 | Ganesh et al. |
| 9,684,545 B2 | 6/2017 | Beale |

(Continued)

OTHER PUBLICATIONS

Engelmann et al., Resiliency for High-Performance Computing, Apr. 2008.

(Continued)

*Primary Examiner* — Abu Zar Ghaffari
(74) *Attorney, Agent, or Firm* — Garg Law Firm, PLLC; Rakesh Garg; Randy Emilio Tejeda

(57) ABSTRACT

An embodiment includes issuing an indication that a thread is a time-critical thread. The embodiment initiates an active partition migration, from a source server to a destination server, of a source partition on which the program is stored. The embodiment stores, during the migration, records of locations of pages in memory referenced by the time-critical thread. The embodiment detects that a migration threshold has been reached, indicative of a threshold portion of the migration being complete. Responsive to detecting the migration threshold, the embodiment performs a priority migration of the time-critical thread. The priority migration includes suspending execution of the time-critical thread at the source server, retrieving the records of the locations of the pages in memory referenced by the time-critical thread, and issuing a command to transfer content from the pages to the destination server. The embodiment also includes issuing a migration command to complete the migration.

18 Claims, 8 Drawing Sheets

(56) References Cited

U.S. PATENT DOCUMENTS

| | | | |
|---|---|---|---|
| 10,148,743 B2 | 12/2018 | Birkestrand et al. | |
| 10,554,501 B2 | 2/2020 | Parandehgheibi et al. | |
| 11,474,857 B1* | 10/2022 | Biemueller | G06F 9/45558 |
| 2008/0127182 A1 | 5/2008 | Newport et al. | |
| 2008/0250406 A1* | 10/2008 | Carpenter | G06F 21/53 |
| | | | 718/1 |
| 2011/0296024 A1* | 12/2011 | Madani | G06F 9/5061 |
| | | | 709/226 |
| 2013/0073731 A1* | 3/2013 | Bose | G06F 9/5088 |
| | | | 709/226 |
| 2015/0154040 A1* | 6/2015 | Inada | G06F 9/45533 |
| | | | 718/1 |
| 2015/0331715 A1* | 11/2015 | Sathyanarayana | G06F 9/5055 |
| | | | 718/1 |
| 2017/0149921 A1* | 5/2017 | Nassi | H04L 67/2885 |
| 2019/0205220 A1* | 7/2019 | Zhang | G06F 11/1469 |
| 2021/0026707 A1* | 1/2021 | Rosenberg | G06F 9/45558 |
| 2021/0141654 A1* | 5/2021 | Veale | G06F 9/45545 |
| 2021/0173685 A1* | 6/2021 | Tsirkin | H04L 9/0825 |
| 2021/0342232 A1* | 11/2021 | Gopalan | G06F 11/1451 |

OTHER PUBLICATIONS

CSE Staff, Infrastructure as a Service (IAAS)—Virtual Machine Provisioning and Migration Services, 2010.

Symantec, Storage Foundation and High Availability for Windows, 2017.

ip.com, VM Migration based on multi criterion ranking of Hypervisors and Virtual Machines in Software Defined Data Center (SDDC) Environments, Dec. 29, 2014.

ip.com, Method for identifying the necessity of devices for Virtual Machine migration, Oct. 6, 2016.

ip.com, Method for tracking association of tasks and its memory references in order to improve locality of reference in a NUMA system, Feb. 8, 2017.

ip.com, Method to reduce the time for live partition migration via cooperative approach by database manager, May 28, 2012.

* cited by examiner

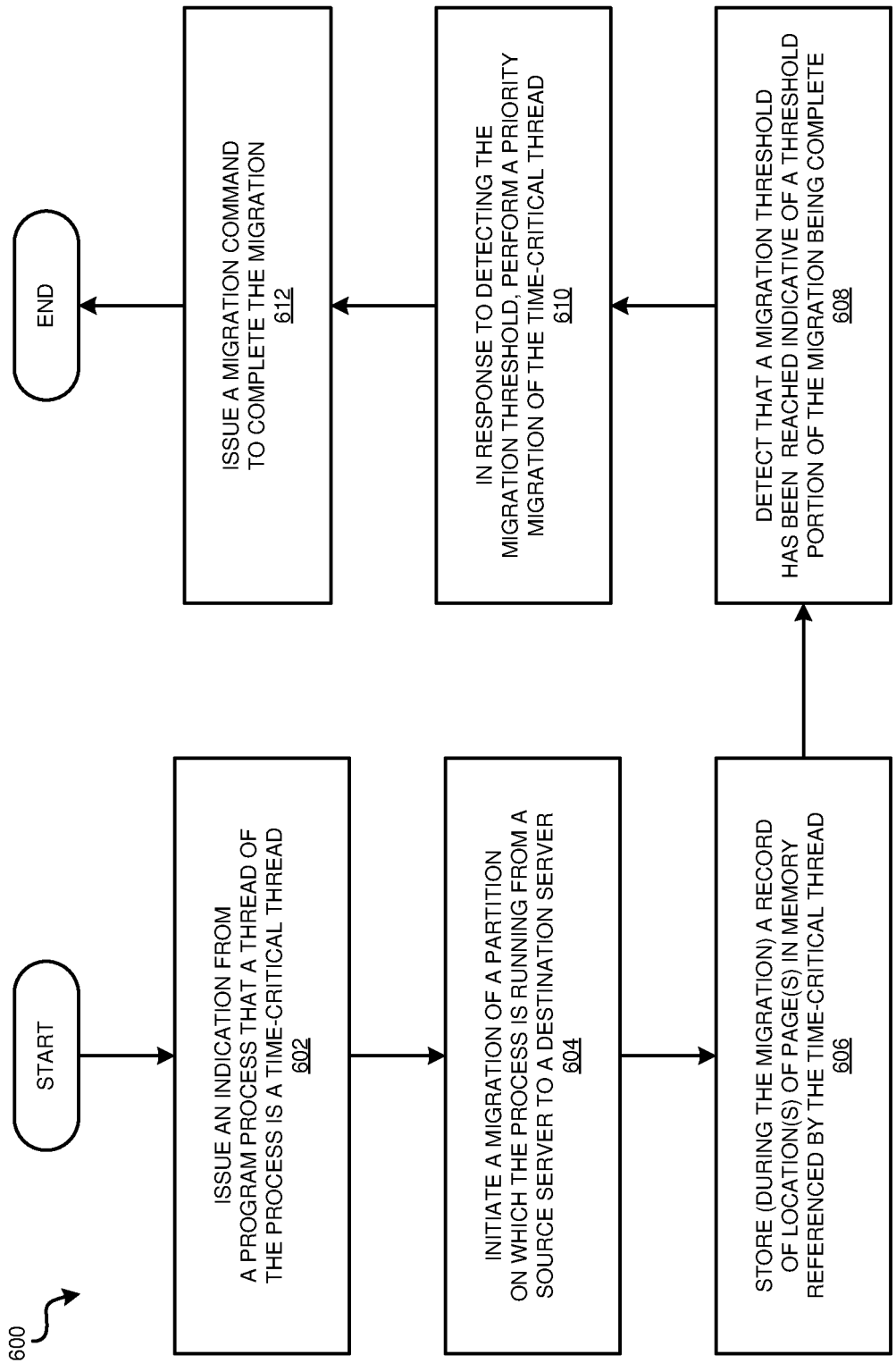

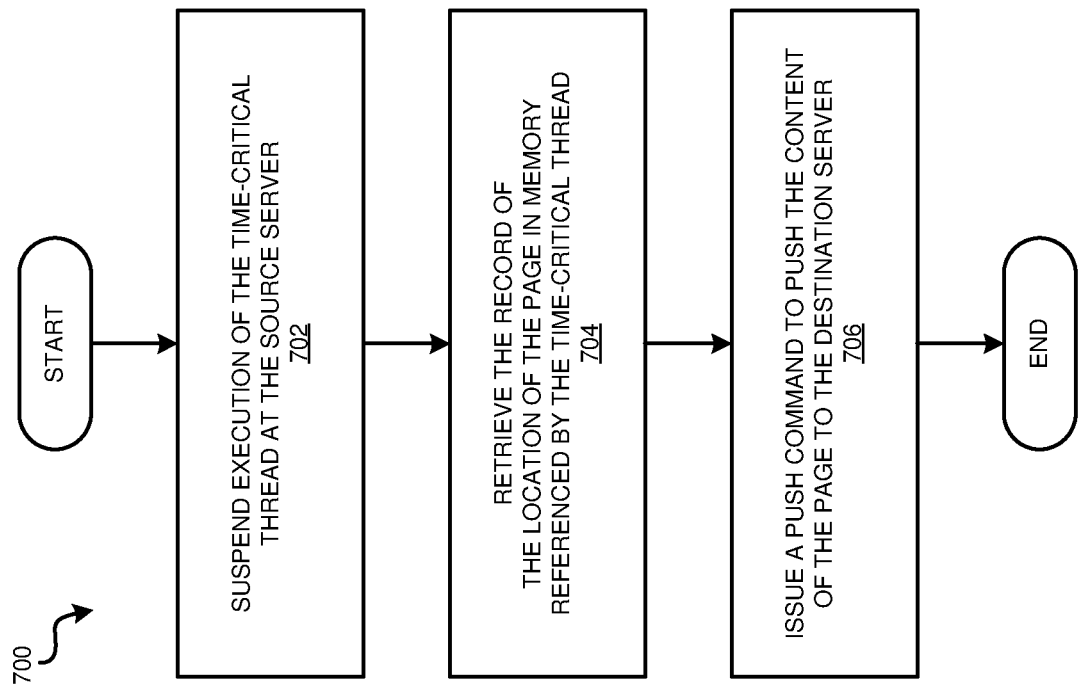

PARTITION MIGRATION WITH CRITICAL TASK PRIORITIZATION

BACKGROUND

The present invention relates generally to a method, system, and computer program product for virtual machines and management of computer clusters. More particularly, the present invention relates to a method, system, and computer program product for partition migration with critical task prioritization.

Distributed computing services have become commonplace that are available to be accessed over a network. For example, Infrastructure as a Service (IaaS) is a cloud based service that provides physical processing resources to run virtual machines (VMs) as a guest for different customers. The virtual machines may be configured and employed for a wide variety of uses, such as hosting an application or running a server.

There are times with it becomes necessary or desirable to migrate a workload in one computer system (a source) to another computer system (a target). Often, workload migration takes the form of migrating one or more virtual machines (sometimes referred to as logical partitions) from the source to the target, the migrated virtual machine's workload previously being performed in the source being subsequently performed in the target. For example, each client of a server may have its own virtual machine within the server for one or more respective client processes, so the workload is migrated by moving the workload of one or more clients, and reconstructing the virtual machine parameters, on one or more other server systems. A virtual machine may be migrated to balance workload among multiple systems, but may also be migrated to perform maintenance on the source system or for some other reason.

SUMMARY

The illustrative embodiments provide for partition migration with critical task prioritization. An embodiment includes issuing an indication from a process of a program that a thread of the process is a time-critical thread. The embodiment also includes initiating an active partition migration, from a source server to a destination server, of a source partition on which the program is stored, wherein the active partition migration initiates with the source partition on the source server being an active partition on which the process is running. The embodiment also includes storing, during the migration, a first record of a first location of a first page in memory referenced by the time-critical thread. The embodiment also includes detecting that a migration threshold has been reached indicative of a threshold portion of the migration being complete. The embodiment also includes performing, responsive to detecting the migration threshold, a priority migration of the time-critical thread, wherein the priority migration comprises suspending execution of the time-critical thread at the source server, retrieving the first record of the first location of the first page in memory referenced by the time-critical thread, and issuing a command to transfer content from the first page to the destination server. The embodiment also includes issuing a migration command to complete the migration. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for partition migration with critical task prioritization in accordance with an illustrative embodiment; and FIG. 7 depicts a flowchart of an example process for priority migration in accordance with an illustrative embodiment.

DETAILED DESCRIPTION

Figure 1:
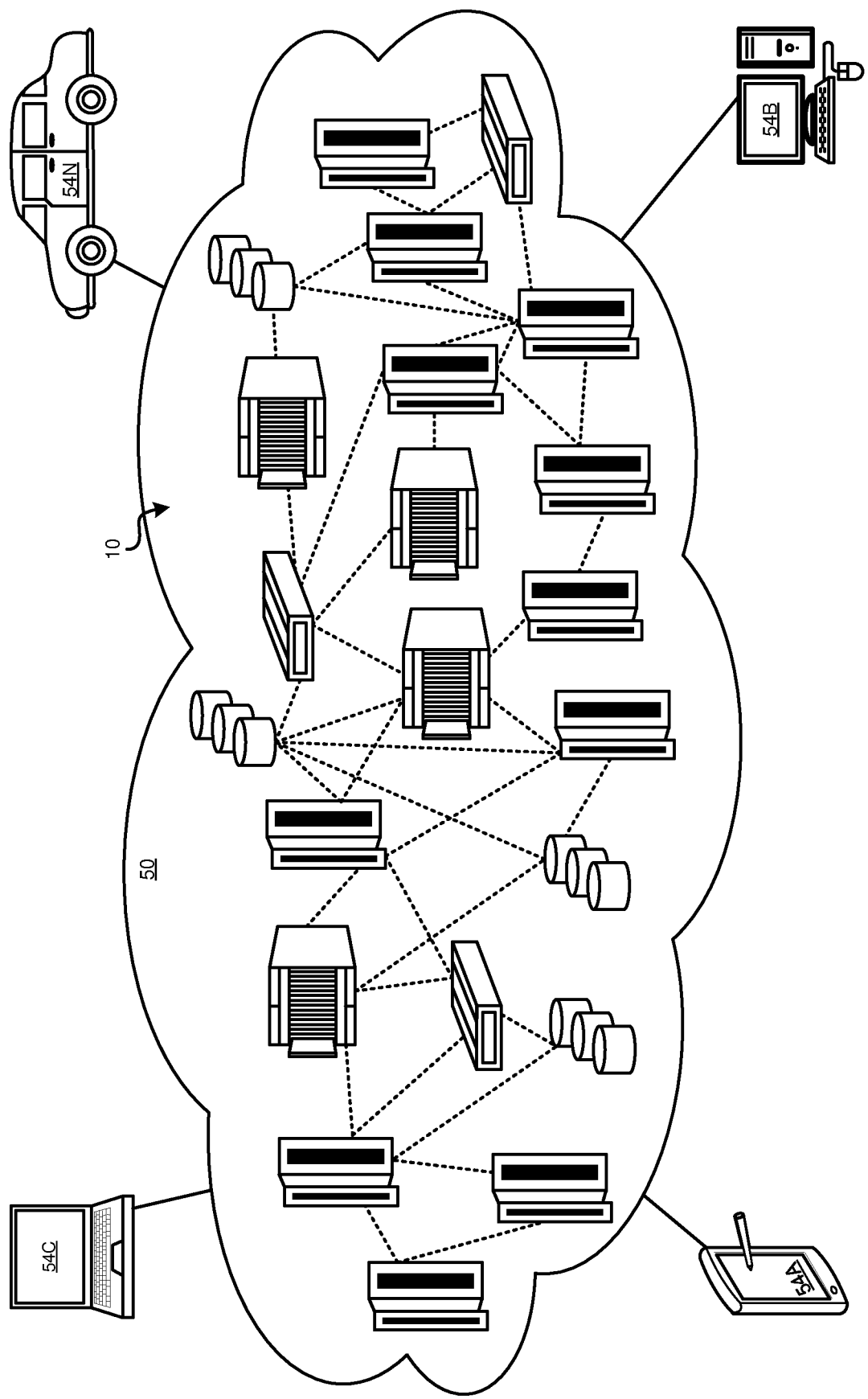
FIG. 1 depicts a cloud computing environment according to an embodiment of the present invention.

In a typical computing environment, a program is an executable file that contains instructions (i.e., program instructions) that are executable by a processor to cause the processor to perform certain operations. Programs are stored on computer readable storage media, such as an optical disk or solid state disk. Programs are read into primary memory (e.g., RAM) and executed by a kernel. This starts a process that runs the program in the primary memory. Typically, several instances of a program can be executed on a computer at the same time, with each instance being a separate process.

Each process has one or more threads, which are executable units of the process. For example, when a program is executed and an associated process begins, the creation of the process starts the execution of a main thread of that process. A process can have multiple threads, with each thread independently performing a specific task of the program. For example, for a text editing program, one thread may be processing user inputs while another thread may be printing a document.

There are many situations in which certain threads are time-critical (i.e., time-critical threads), which means the time-critical thread must be completed by some specific time to prevent an error or failure of some kind. For example, in a clustered system, cluster-aware applications typically depend on heartbeats (or lease renewals) to determine the health of the members of the cluster. Cluster nodes are periodically polled, which triggers time-critical threads at each of the cluster nodes that must respond within some fixed amount time. When a time-critical thread on a node fails to promptly reply to the heartbeat polling, other members of the cluster may expel the slow node based on an assumption that the slow node is failing or has become unavailable. As a result, the performance of the cluster may suffer until the node reboots or is replaced.

A common scenario in which time-critical threads fail involves execution of a time-critical thread during an active partition migration process. An active partition migration is the actual movement of an active partition (i.e., a partition that has one or more running processes) from one physical computer readable storage medium to another computer readable storage medium. This is in contrast to an inactive partition migration that involves transferring a partition that is logically 'powered off' (not running) from one system to another, or a suspended partition migration that involves transferring a partition that is suspended from one system to another.

During an active partition migration, a partition (or operating system) is typically migrated from a source memory to a destination memory in a series of iterative steps. Initially, memory pages are copied or transferred from the source partition to the new destination memory. The source-side partition remains active during this stage of the active partition migration, meaning that processes are allowed to continue executing on the source system. The running processes can also have the effect of causing moved pages to be brought back to the source system if they are needed for an executing thread. When a threshold portion of the migration has been completed (e.g., the majority of memory pages have been moved to the destination system), the destination-side partition becomes the active partition, meaning that processes begin running on the destination system rather than the source system while the migration is completed.

If the workload running on the source system is at a high enough load and is modifying pages at a high rate from the migrating partition, the hypervisor may need to suspend the workload to complete the migration with many pages still residing on the source partition. When this occurs, there may be a significant lag in time before critical tasks are allowed to run again on the destination partition. That gap is exasperated when much memory is being moved and/or the network linking the systems is saturated. If a time-critical thread is running during this migration, the lag before tasks are allowed to run can cause such time-critical threads to fail. So, for example, if a heartbeat thread is running, the lag can cause the node to fail to respond to the heartbeat poll, causing the system to be expelled from the cluster.

To address these technical problems, disclosed embodiments introduce a process that reduces the potential latency associated with migration of time-critical threads during an active partition migration. In some embodiments, the process involves a coordinated effort between an operating system and a hypervisor to reduce the potential latency associated with the active partition migration of time-critical threads. In some embodiments, the operating system provides an interface to mark threads as time-critical threads. In some such embodiments, the operating system restricts the privilege that can be marked as time-critical threads to prevent this process from becoming ineffective due to too many threads being designated as time-critical threads.

In some such embodiments, when an active partition migration begins, the operating system performs normally, and additionally begins to record pages referenced by the time-critical threads. In this way, the operating system begins to create a record of the pages needed by the time-critical threads to operate. The operating system also tracks the progress of the migration, for example by monitoring a hypervisor metric associated with the progress of the migration or the remaining percentage of the migration before completion. When the operating system detects that the migration is nearing completion, the operating system begins performing a priority migration process for migrating the time-critical threads. For example, in some embodiments, the operating system begins performing the priority migration process upon detecting that a threshold portion of the migration is complete. In some embodiments, the operating system begins performing the priority migration process upon detecting the threshold portion has been completed by detecting that the destination-side partition has become the active partition.

In some embodiments, the priority migration process includes suspending execution of time-critical threads until they can run on the destination system. In some embodiments, the priority migration process includes identifying the pages associated with the address spaces of the time-critical threads. In embodiments in which the operating system begins creating a record of the pages needed by the time-critical threads when an active partition migration begins, the operating system identifies the pages associated with the address spaces of the time-critical threads using the records it created when the migration began.

In some embodiments, the priority migration process includes making one or more hypervisor calls to transfer the pages needed by the time-critical threads to the destination system. In some embodiments, the hypervisor calls are made with a "push these pages" semantic to push the pages needed by the time-critical threads to the destination system. In some embodiments, the interface for the hypervisor call may be advisory, meaning that the hypervisor call makes requests of the hypervisor that the hypervisor is free to fulfill or ignore. For example, the hypervisor may fulfill the request or ignore it depending on the status of the network between the source and the destination, the traffic on the network, etc. In some embodiments, once all of the pages needed by the time-critical threads have been transferred to the destination system, the operating system makes another call to the hypervisor to force the migration of any remaining pages on the source partition.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

With reference to FIG. 1, this figure illustrates cloud computing environment 50. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
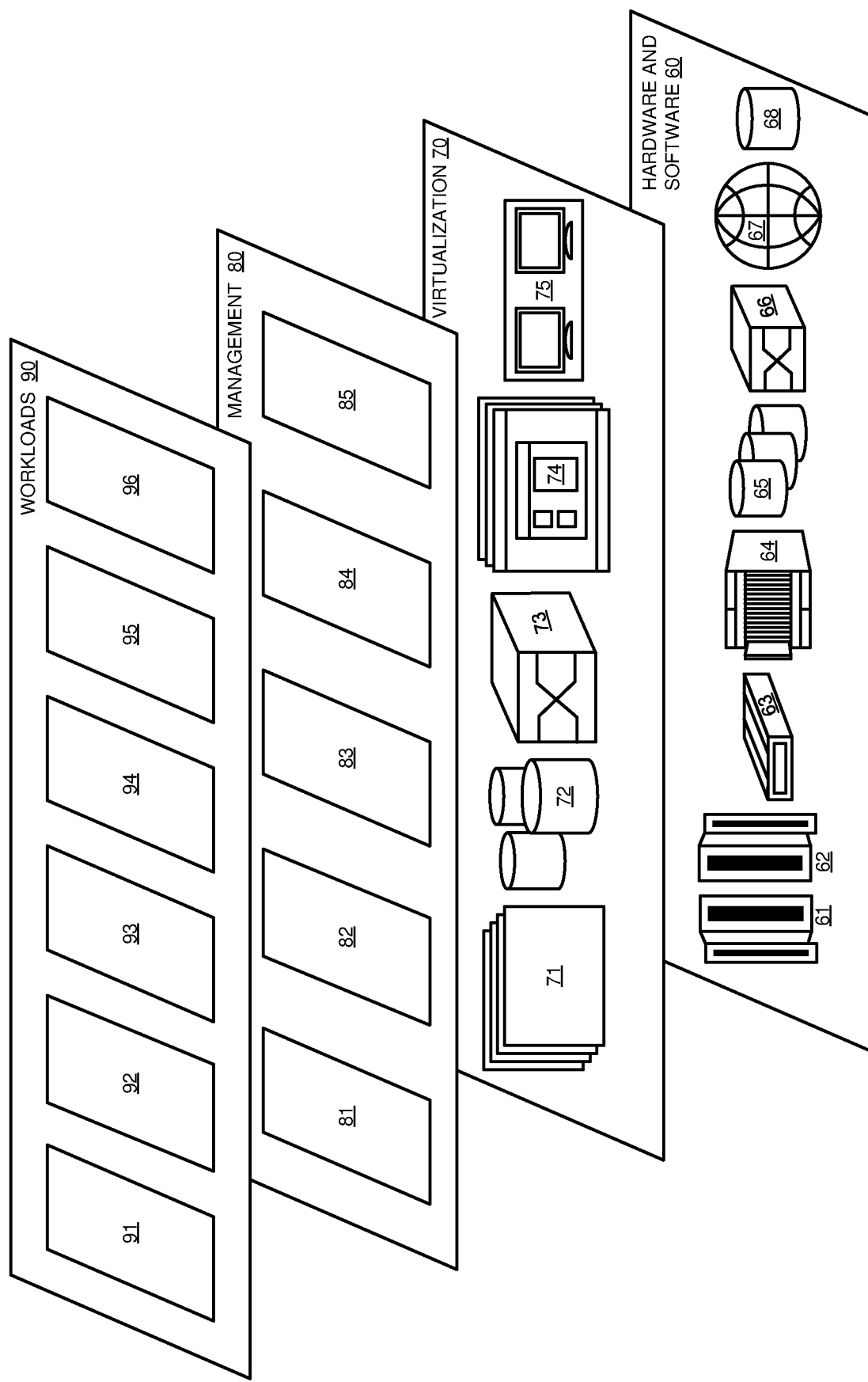
FIG. 2 depicts abstraction model layers according to an embodiment of the present invention.

With reference to FIG. 2, this figure depicts a set of functional abstraction layers provided by cloud computing environment 50 (FIG. 1). It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual machine management processing 96.

Figure 3:
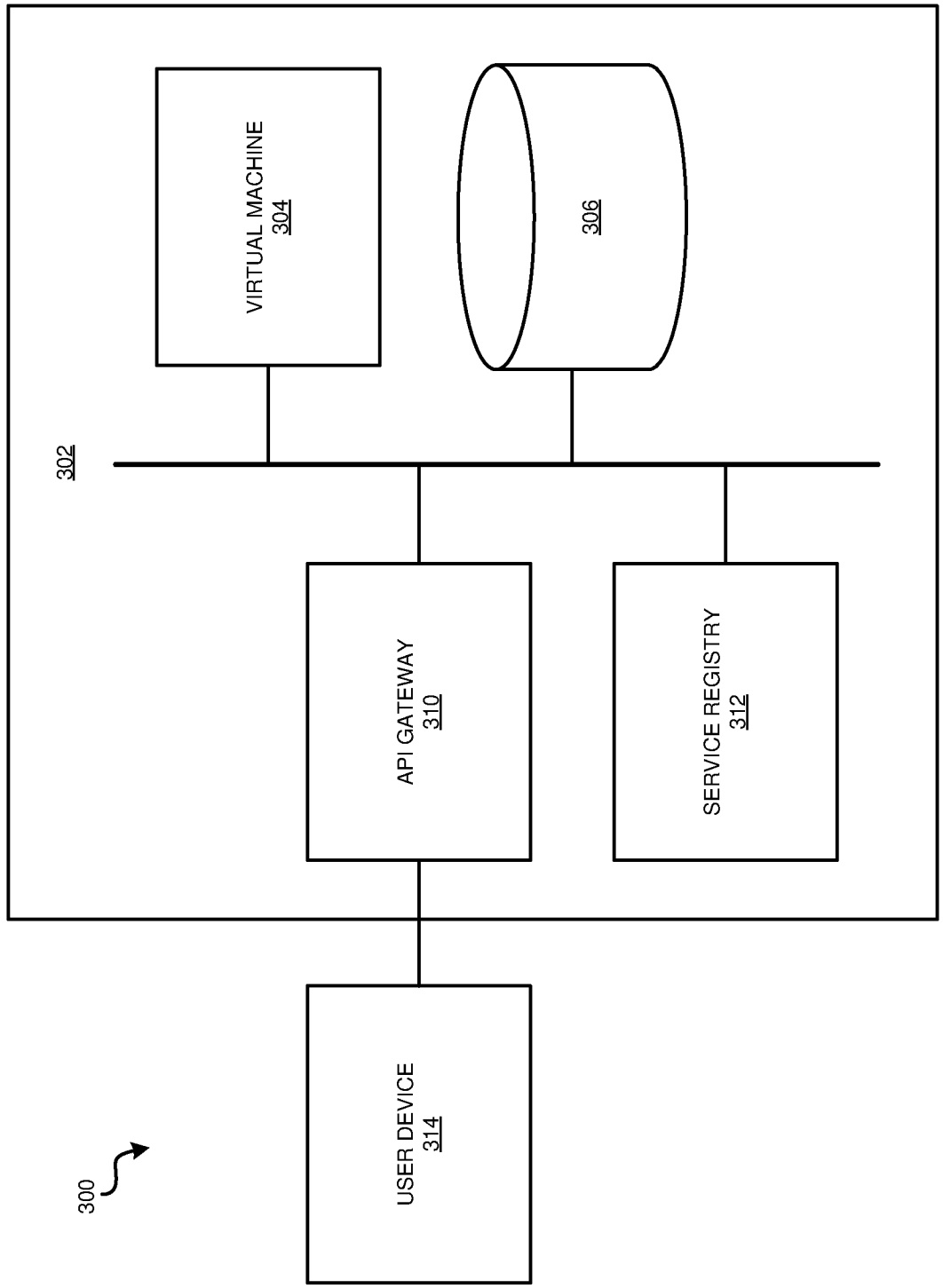
FIG. 3 depicts a block diagram of an example service infrastructure that includes a virtual machine in accordance with an illustrative embodiment.

With reference to FIG. 3, this figure depicts a block diagram of an example cloud computing environment 300 in accordance with an illustrative embodiment. In the illustrated embodiment, the cloud computing environment 300 includes service infrastructure 302 that includes a virtual machine 304 in accordance with an illustrative embodiment. In some embodiments, the virtual machine 304 is deployed in workloads layer 90 of FIG. 2. By way of example, in some embodiments, virtual machine 304 is implemented using virtual machine management processing 96 in FIG. 2.

In the illustrated embodiment, the service infrastructure 302 provides services and service instances to a user device 314. User device 314 communicates with service infrastructure 302 via an API gateway 310. In various embodiments, service infrastructure 302 and its associated virtual machine 304 serve multiple users and multiple tenants. A tenant is a group of users (e.g., a company) who share a common access with specific privileges to the software instance. Service infrastructure 302 ensures that tenant specific data is isolated from other tenants.

In the illustrated embodiment, service infrastructure 302 includes a service registry 312. In some embodiments, service registry 312 looks up service instances of virtual machine 304 in response to a service lookup request such as one from API gateway 310 in response to a service request from user device 314. For example, in some embodiments, the service registry 312 looks up service instances of virtual machine 304 in response to requests related to experience encapsulation processing from the user device 314.

In some embodiments, the service infrastructure 302 includes computer readable storage media 306 and one or more instances of the virtual machine 304. In some such embodiments, each of the multiple instances of the virtual machine 304 run independently on multiple computing systems. In some such embodiments, virtual machine 304, as well as other service instances of virtual machine 304, are registered in service registry 312.

In some embodiments, service registry 312 maintains information about the status or health of each service instance including performance information associated each of the service instances. In some such embodiments, such information may include various types of performance characteristics of a given service instance (e.g., cache metrics, etc.) and records of updates.

In some embodiments, user device 314 connects with API gateway 310 via any suitable network or combination of networks such as the Internet, etc. and uses any suitable communication protocols such as Wi-Fi, Bluetooth, etc. Service infrastructure 302 may be built on the basis of cloud computing. API gateway 310 provides access to client applications like virtual machine 304. API gateway 310 receives service requests issued by client applications, and creates service lookup requests based on service requests. As a non-limiting example, in an embodiment, the user device 314 executes a routine to initiate interaction the virtual machine 304. For instance, in some embodiments, the user accesses the virtual machine 304 directly using a command line or GUI to review or search ontologies. Also, in some embodiments, the user accesses the virtual machine 304 indirectly through the use of a web application that interacts with the virtual machine 304 via the API gateway 310.

Figure 4A:
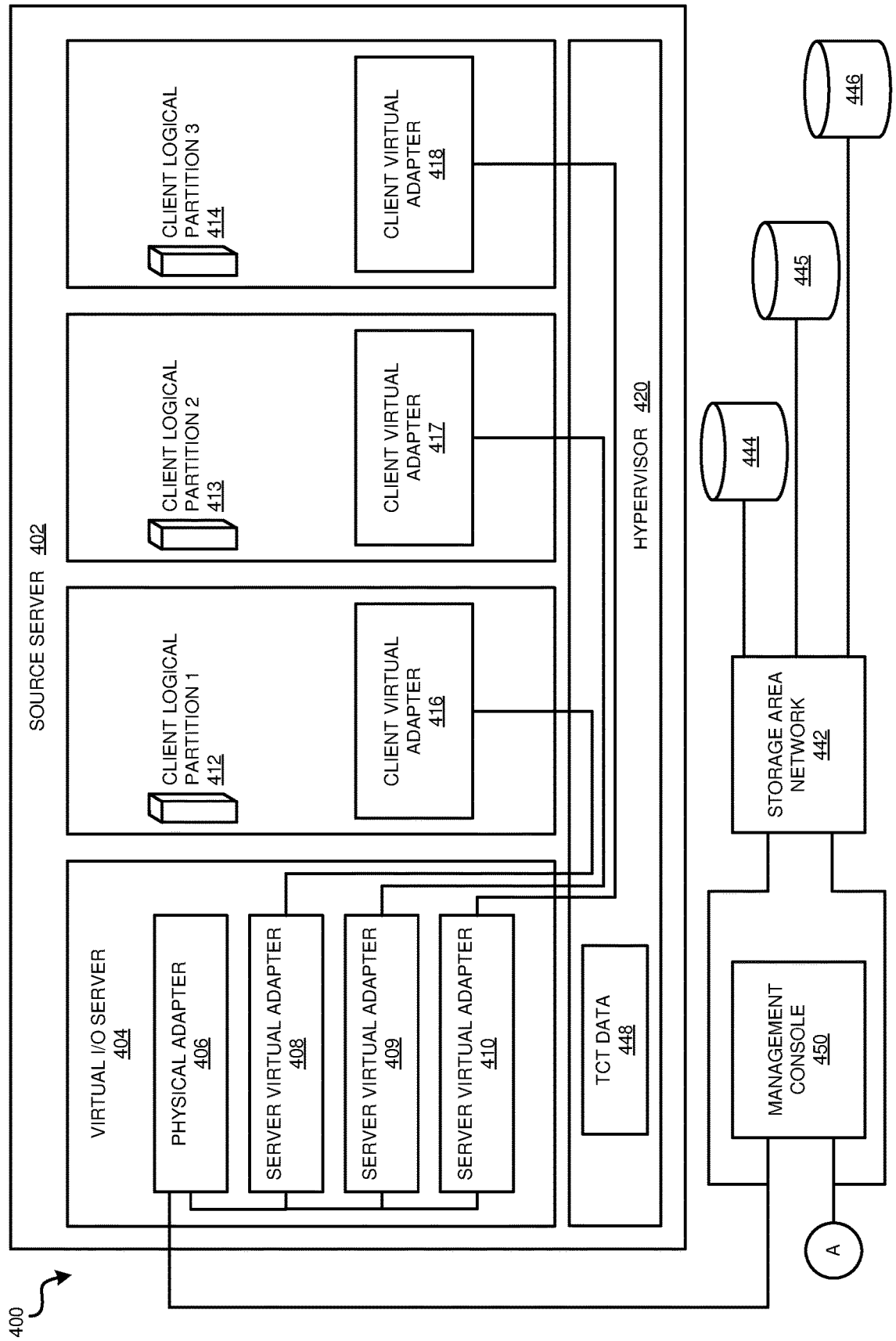
FIG. 4A depicts a first portion of an example high-level diagram of a nodal system architecture for a computer system in accordance with an illustrative embodiment.
Figure 4B:
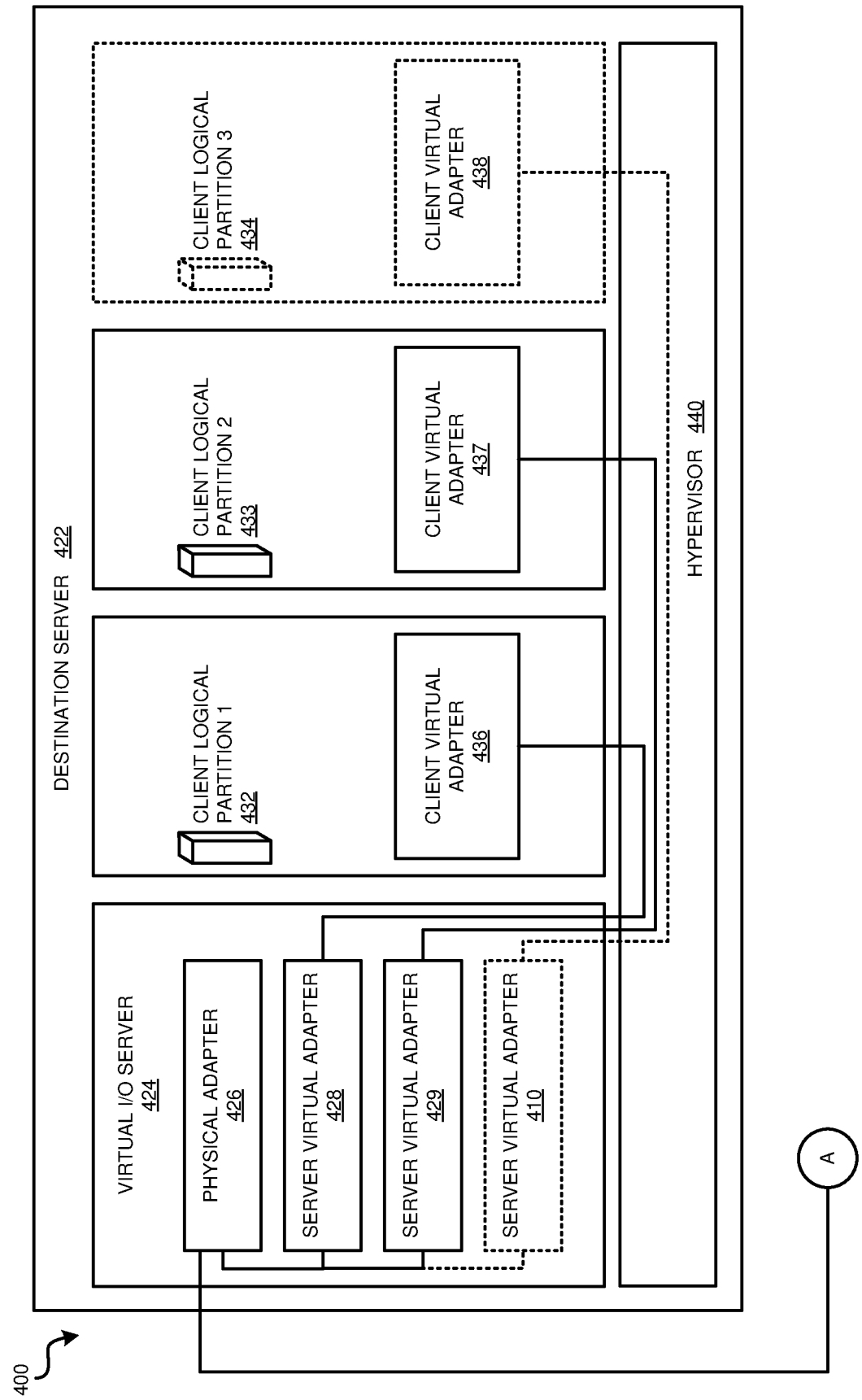
FIG. 4B depicts a second portion of an example high-level diagram of a nodal system architecture for a computer system in accordance with an illustrative embodiment.

With reference to FIG. 4A and FIG. 4B, these figures depict respective portions of an example high-level diagram of a nodal system architecture 400 for a computer system, such as may be employed in cloud computing environment 50, in accordance with an illustrative embodiment. A nodal system architecture nodal system architecture 400 is simply one form of implementing disclosed embodiments. In some embodiments, the source server 402 and destination server 422 are examples of a RISC architecture-based server 62, a server 63, or a blade server 64 of FIG. 2. in the illustrated embodiment, the source server 402 includes a hypervisor 420 and the destination server 422 includes a hypervisor 440. In some embodiments, the hypervisors 420, 440 are examples of network application server software 67 of FIG. 1.

The nodal system architecture 400 comprises multiple nodes, including a source server 402 and a destination server 422. The source server 402 and destination server 422 use "virtualization" to provide isolation between different operating environments sharing the same physical resources, and thereby provide a form of secure operating environments. The virtualization provides a logical abstraction of computing resources from physical constraints. In the illustrated embodiment, the abstraction is provided in the form of client logical partitions 412-414 and client logical partitions 432-434, which each have a direct interface to the physical hardware while maintaining the abstraction. Virtualization technology allows multiple partitions on the same physical hardware to operate independently, for example as virtual machines that are isolated from each other. The client logical partitions 412-414 are managed by hypervisor 420 and client logical partitions 432-434 are managed by hypervisor 440. In some embodiments, the hypervisor 420 is a software or firmware layer component responsible for hosting and managing the client logical partitions 412-414 and the hypervisor 440 is a software or firmware layer component responsible for hosting and managing the client logical partitions 432-434. For example, in some embodiments, the hypervisor 420 manages the system processor, memory, and allocates other resources for each of the client logical partitions 412-414 and the hypervisor 440 manages the system processor, memory, and allocates other resources for each of the client logical partitions 432-434. While three client logical partitions are shown on each of the source and destination servers 402, 422, actual implementations may include any number of client logical partitions.

The source server 402 includes a virtual I/O server 404, client logical partitions 412-414, and hypervisor 420. The virtual I/O server 404 includes a physical adapter 406 and server virtual adapters 408-410. The client logical partitions 412-414 include client virtual adapters 416-418, respectively. The hypervisor 420 includes time-critical thread (TCT) data 448. The destination server 422 includes a virtual I/O server 424, client logical partitions 432-434, and hypervisor 440. The virtual I/O server 424 includes a physical adapter 426 and server virtual adapters 428-430. The client logical partitions 432-434 include client virtual adapters 436-438, respectively. The source server 402 and destination server 422 are in communication with a storage area network 442, which is in communication with a plurality of computer readable storage media 444-446.

The source server 402 and destination server 422 are also in communication with a management console 450. The management console 450 is utilized to perform the active partition migration operations. For example, in the illustrated embodiment, the management console 450 is in the process of performing an active partition migration of client logical partition 414 (partition #3) from the source server 402 to the destination server 422. In FIGS. 4A and 4B, the client logical partition 414 is the pre-migration partition on source server 402 and the client logical partition 434 is the post-migration partition copy of client logical partition 414 on the destination server 422. While this embodiment is described with reference to migrating client logical partition 414, this description applies to migrating other partitions on a server and to migrating groups of partitions on a server.

An active partition migration may be performed for many different reasons. For example, an active partition migration may be performed to avoid planned outages for hardware or firmware maintenance by moving logical partitions to another server and then performing the maintenance. Partition migrations may also be used to work around scheduled maintenance activities, to avoid downtime for server upgrades, to move partitions from a server indicating a potential failure before the failure occurs and avoid unplanned downtime, to consolidate workloads running on several small, under-used servers onto a single large server, or to optimize resource use and workload performance within a computing environment.

The operating system and other software programs for the client logical partition 414 are stored on one or more of the computer readable storage media 444-446, which are accessible to both the source server 402 and the destination server 422. The computer readable storage media 444-446 are in communication with the client logical partition 414 on the source server 402 via storage area network 442, physical adapter 406, server virtual adapter 410, hypervisor 420, and client virtual adapter 418. The computer readable storage media 444-446 are also in communication with the client logical partition 434 on the destination server 422 via storage area network 442, physical adapter 426, server virtual adapter 430, hypervisor 440, and client virtual adapter 438. Thus, the computer readable storage media 444-446 that provided accessible data and program storage for the pre-migration partition (client logical partition 414) continue to provide accessible data and program storage for the post-migration partition (client logical partition 434) after the migration is complete.

Figure 5:
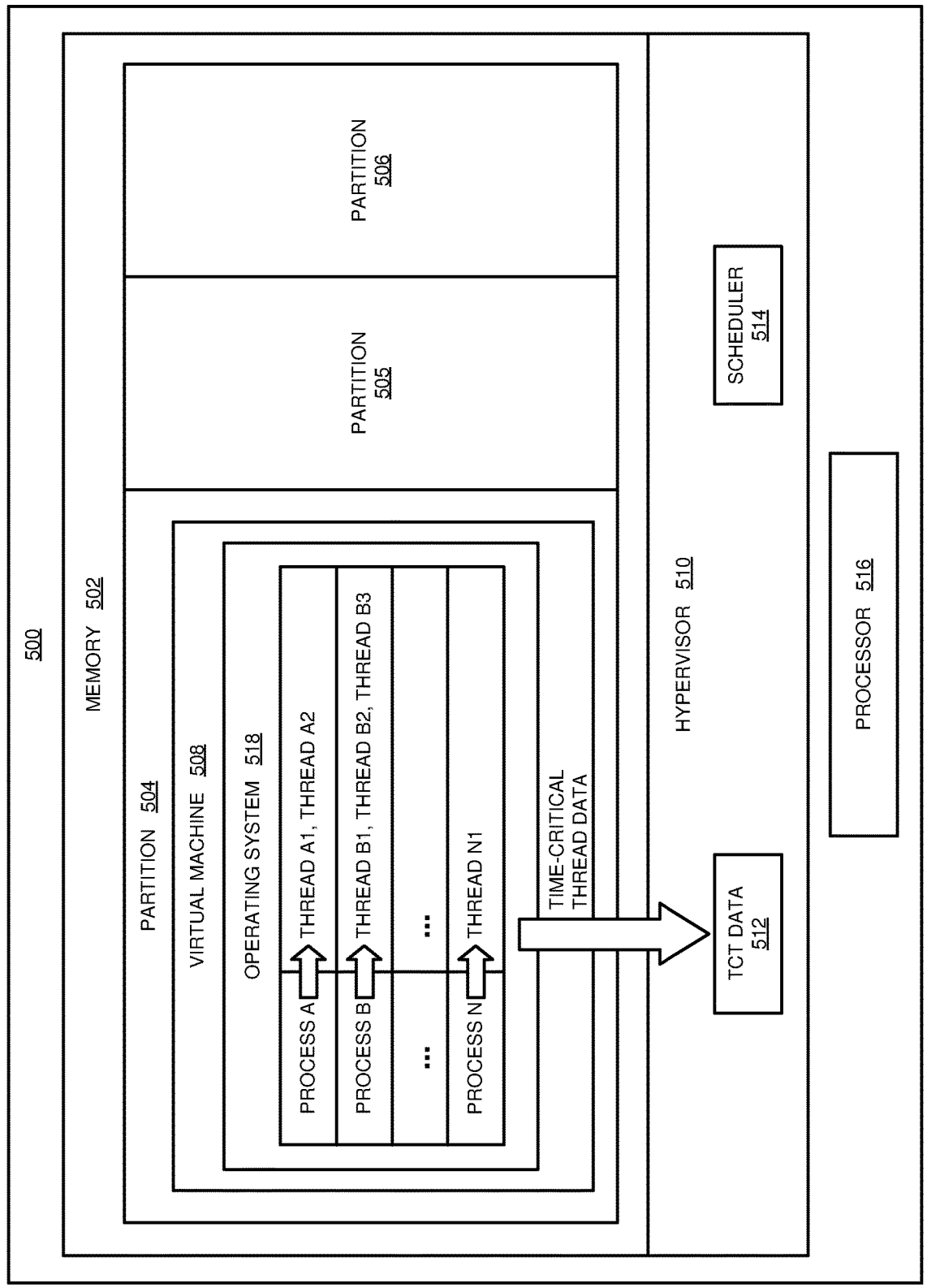
FIG. 5 depicts a block diagram of an example high-level diagram of a server in a nodal system architecture in accordance with an illustrative embodiment.

With reference to FIG. 5, this figure depicts a block diagram of an example high-level diagram of a server 500 in a nodal system architecture, such as may be employed in cloud computing environment 50, in accordance with an illustrative embodiment. The example embodiment includes memory 502 having partitions 504-506. In a particular embodiment, server 500 is an example of source server 402 of FIG. 4A and partition 504 is an example of client logical partition 414 of FIG. 4A. The example embodiment also includes hypervisor 510, which is an example of hypervisor 420 of FIG. 4A.

The server 500 uses virtualization to provide isolation between different operating environments sharing the same physical resources, and thereby provides a form of secure operating environments. The virtualization provides a logical abstraction of computing resources from physical constraints. In the illustrated embodiment, the abstraction is provided in the form of partitions 504-506, including virtual machine 508 on partition 504. Partitions 504-506 each have a direct interface to the physical hardware, including processor 516, while maintaining the abstraction. Virtualization technology allows the partitions 504-506 running on the same physical hardware to operate independently and isolated from each other. The partitions 504-506 are managed by the hypervisor 510. In some embodiments, the hypervisor 510 is a software or firmware layer component responsible for hosting and managing the partitions 504-506, including virtual machine 508 on partition 504. For example, in some embodiments, the hypervisor 510 uses a scheduler 514 to manage the sharing of the system processor 516 and memory 502 among the partitions 504-506 and allocate other resources for each of the partitions 504-506, including virtual machine 508 on partition 504. While three partitions 504-506 are shown, actual implementations may include any number of partitions.

In an exemplary embodiment, operating system 518 maintains a list of running processes and their threads. In some embodiments, the operating system 518 maintains priority information for each thread, including an indication of threads that are time-critical threads. In some embodiments, the operating system 518 receives the thread information from their respective processes. In some embodiments, the operating system 518 provides information about the threads to the hypervisor 510. In particular, in some embodiments, the operating system 518 provides a list of time-critical threads to the hypervisor 510. In some embodiments, the operating system 518 also provides information about pages in memory used by the time critical threads to the processor 516. In the illustrated embodiment, the hypervisor 510 stores the thread information, including the list of time-critical threads and pages in memory used by the time-critical threads, in memory as TCT data 512.

In some embodiments, the hypervisor 510 may initiate an active partition migration, for example in response to an instruction from a management console, such as management console 450 of FIG. 4A. For example, the hypervisor 510 may initiate an active partition migration to migrate the partition 504 (including the virtual machine 508) to a destination server, such as destination server 422 shown in FIG. 4B, while maintaining the partition 504 as an active partition on which the virtual machine 508 and operating system 518 is running. During the migration, the operating system 518 continues to provide the thread information to the processor 516, including information identifying time-critical threads and pages in memory used by the time-critical threads.

In some embodiments, the operating system 518 monitors the progress of the migration of the partition 504 to a destination server, for example by using hypervisor calls to check the progress as monitored by the hypervisor 510. In some such embodiments, once the operating system 518 detects that a particular migration threshold has been reached, the operating system 518 initiates a priority migration procedure.

In some embodiments, the operating system 518 detects a particular migration threshold by detecting that a predetermined threshold percentage or portion of the migration has been completed. In some embodiments, operating system 518 detects a particular migration threshold by detecting that the copy of the partition 504 at the destination server has become the active partition. In some embodiments, the switchover that changes the active partition from the copy of the partition on the source server to the copy of the partition on the destination server occurs once a predetermined percentage or portion of the migration has been completed. The exact percentage or portion may be largely implementation specific, depending, for example, on the type of processes running on the partition being migrated, and may be set by a migration console, such as migration console 450, according to known techniques.

In some embodiments, the priority migration procedure performed by the operating system 518 includes performing a series of actions for each of the running time-critical threads. In some such embodiments, the series of actions include suspending execution of the time-critical thread by the operating system 518, retrieving the record of the location of the page or pages in memory referenced by the time-critical thread, and issuing an instruction to the hypervisor 510 to transfer the contents of the page(s) to the destination server. In some such embodiments, the operating system 518 issues the instruction to the hypervisor 510 as an advisory hypervisor call, meaning that the hypervisor 510 is free to fulfill or ignore the request in the call. For example, the hypervisor may fulfill the request or ignore it depending on the status of the network between the source and the destination, the traffic on the network, etc.

With reference to FIG. 6, this figure depicts a flowchart of an example process 600 for partition migration with critical task prioritization in accordance with an illustrative embodiment. In a particular embodiment, the source server 402 or server 500 carries out the process 600.

In an embodiment, at block 602, the process issues an indication from a process of a program that a thread of the process is a time-critical thread. Next, at block 604, the process initiates an active partition migration, from a source server to a destination server, of a source partition on which the program is stored. In some embodiments, the active partition migration initiates with the source partition on the source server being an active partition on which the process is running. Next, at block 606, the process stores, during the migration, a first record of a first location of a first page in memory referenced by the time-critical thread. Next, at block 608, the process detects that a migration threshold has been reached indicative of a threshold portion of the migration being complete. Next, at block 610, the process performs, responsive to detecting the migration threshold, a priority migration of the time-critical thread. In some embodiments, the priority migration comprises the process shown in FIG. 7. Next, at block 612, the process issues a migration command to complete the migration.

With reference to FIG. 7, this figure depicts a flowchart of an example process 700 for priority migration in accordance with an illustrative embodiment. In a particular embodiment, the source server 402 or server 500 carries out the process 700. In some embodiments, the process 700 is an example of a priority migration performed at block 610 of FIG. 6.

In an embodiment, at block 702, the process suspends execution of the time-critical thread at the source server.

Next, at block 704, the process retrieves the record of the location(s) of the page(s) in memory referenced by the time-critical thread. Next, at block 706, the process issuing a command to transfer content from the page(s) to the destination server.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
issuing an indication from a process of a program that a thread of the process is a time-critical thread wherein the issuing of the indication from the process includes issuing the indication to an operating system;
initiating an active partition migration, from a source server to a destination server, of a source partition on which the program is stored, wherein the active partition migration initiates with the source partition on the source server being an active partition wherein the process is running on the active partition and wherein the active partition comprises one or more running processes;
storing, during the migration, a first record of a first location of a first page in memory referenced by the time-critical thread;
detecting that a migration threshold has been reached indicative that a copy of the active partition at the destination server has become the active partition;

performing, responsive to detecting the migration threshold is reached, a priority migration of the time-critical thread, wherein the priority migration comprises:
suspending execution of the time-critical thread at the source server;
retrieving the first record of the first location of the first page in memory referenced by the time-critical thread; and
issuing a command to transfer content from the first page to the destination server; and
issuing a migration command to complete the migration.

2. The method of claim 1, wherein the issuing of the indication from the process includes writing a time-critical indicator associated with the thread in a thread control block.

3. The method of claim 1, wherein the initiating of the migration includes issuing, by a hypervisor, a migration initiation command.

4. The method of claim 1, further comprising storing, during the migration, a second record of a second location of a second page in memory referenced by the time-critical thread.

5. The method of claim 4, wherein the priority migration further comprises:
retrieving the second record of the second location of the second page in memory referenced by the time-critical thread; and
issuing a command to transfer the content of the second page to the destination server.

6. The method of claim 1, wherein the issuing of the command to transfer the content comprises issuing a push command to push the content to the destination server.

7. The method of claim 1, wherein the issuing of the command to transfer the content comprises issuing the command by an operating system to a hypervisor.

8. The method of claim 7, wherein the issuing of the command to transfer the content comprises issuing the command by the operating system as a hypervisor call via an advisory interface.

9. The method of claim 8, wherein issuing of the migration command comprises issuing the migration command to the hypervisor.

10. A computer program product comprising one or more computer readable storage media, and program instructions collectively stored on the one or more computer readable storage media, the program instructions executable by a processor to cause the processor to perform operations comprising:
issuing an indication from a process of a program that a thread of the process is a time-critical thread wherein the issuing of the indication from the process includes issuing the indication to an operating system;
initiating an active partition migration, from a source server to a destination server, of a source partition on which the program is stored, wherein the active partition migration initiates with the source partition on the source server being an active partition wherein the process is running on the active partition and wherein the active partition comprises one or more running processes;
storing, during the migration, a first record of a first location of a first page in memory referenced by the time-critical thread;
detecting that a migration threshold has been reached indicative that a copy of the active partition at the destination server has become the active partition;
performing, responsive to detecting the migration threshold is reached, a priority migration of the time-critical thread, wherein the priority migration comprises:
suspending execution of the time-critical thread at the source server;
retrieving the first record of the first location of the first page in memory referenced by the time-critical thread; and
issuing a command to transfer content from the first page to the destination server; and
issuing a migration command to complete the migration.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
program instructions to meter use of the program instructions associated with the request; and
program instructions to generate an invoice based on the metered use.

13. The computer program product of claim 10, wherein the issuing of the indication from the process includes writing a time-critical indicator associated with the thread in a thread control block.

14. The computer program product of claim 10, further comprising storing, during the migration, a second record of a second location of a second page in memory referenced by the time-critical thread.

15. The computer program product of claim 14, wherein the priority migration further comprises:
retrieving the second record of the second location of the second page in memory referenced by the time-critical thread; and
issuing a command to transfer the content of the second page to the destination server.

16. A computer system comprising a processor and one or more computer readable storage media, and program instructions collectively stored on the one or more computer readable storage media, the program instructions executable by the processor to cause the processor to perform operations comprising:
issuing an indication from a process of a program that a thread of the process is a time-critical thread wherein the issuing of the indication from the process includes issuing the indication to an operating system;
initiating an active partition migration, from a source server to a destination server, of a source partition on which the program is stored, wherein the active partition migration initiates with the source partition on the source server being an active partition wherein the process is running on the active partition and wherein the active partition comprises one or more running processes;
storing, during the migration, a first record of a first location of a first page in memory referenced by the time-critical thread;
detecting that a migration threshold has been reached indicative that a copy of the active partition at the destination server has become the active partition;

performing, responsive to detecting the migration threshold is reached, a priority migration of the time-critical thread, wherein the priority migration comprises:
- suspending execution of the time-critical thread at the source server;
- retrieving the first record of the first location of the first page in memory referenced by the time-critical thread; and
- issuing a command to transfer content from the first page to the destination server; and issuing a migration command to complete the migration.

17. The computer system of claim 16, further comprising storing, during the migration, a second record of a second location of a second page in memory referenced by the time-critical thread.

18. The computer system of claim 17, wherein the priority migration further comprises:
- retrieving the second record of the second location of the second page in memory referenced by the time-critical thread; and
- issuing a command to transfer the content of the second page to the destination server.

* * * * *